INVENTORS
ANTHONY A. ANNUNZIATO
ADRIAN R. DOUCETTE
JOSEPH W. PFEIFER
BY
ATTORNEY

United States Patent Office 3,350,624
Patented Oct. 31, 1967

3,350,624
INVERTER CIRCUITS EMPLOYING LOAD-RESPONSIVE SATURABLE TRANSFORMERS
Anthony A. Annunziato, Floral Park, Adrian R. Doucette, Garden City, and Joseph W. Pfeifer, Hauppauge, N.Y., assignors to Sperry Rand Corporation, Great Neck, N.Y., a corporation of Delaware
Filed Sept. 28, 1964, Ser. No. 399,520
8 Claims. (Cl. 321—18)

ABSTRACT OF THE DISCLOSURE

An inverter employing a source of exciting waves, a pair of switching elements, and a saturable core transformer is constructed so that the transformer core will saturate only in response to a load current of predetermined minimum amplitude. Secondary windings on the transformer are connected between the source and the input terminals of the switching element. The impedance of the secondary windings limits the drive to a low value if the transformer core is saturated.

---

Figures 1, 2:
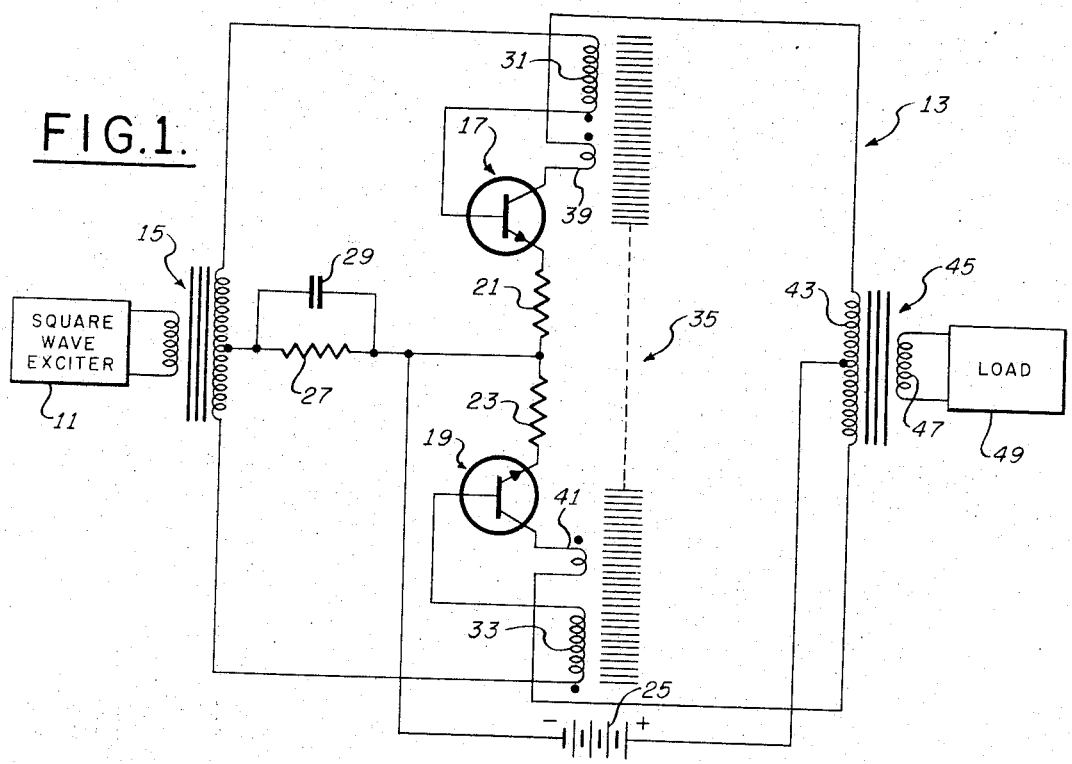

This invention relates to electrical power supplies and more particularly to solid state inverters for converting a voltage from a D.C. source to an A.C. voltage suitable for driving alternating current apparatus.

Solid state electrical inverters are well-known in the art. Many of these inverters employ transistors as switching elements. The transistors are driven by a substantially constant voltage A.C. source. Thus the full driving voltage is applied to the transistors in such circuits regardless of the instantaneous load demand.

If switching type regulators, such as magnetic amplifiers or controlled rectifiers form a major portion of the load on an inverter, the transistors must be driven by a source which is adequate to drive the inverter transistors to saturation during the instantaneous peak current demand. In prior art inverters, this high level of driving signal must be supplied at all times. This results in a waste of driving power in the interval before saturation occurs in a magnetic amplifier or before a controlled rectifier "fires."

During typical operation, for instance, a magnetic amplifier may draw only a small exciting current for the first 100° of each half cycle, leaving just 80° of the half cycle in which the heavy load current is drawn.

If a prior art inverter is used to drive the magnetic amplifier under these conditions, the full drive is applied to the switching transistors even during the 100° of the half cycle in which the transistors must supply only an exciting current for the output transformer. The switching transistors are thus over-driven and considerable power is lost.

It is an object of the present invention to provide an inverter capable of operating with low average driving power.

It is another object of the present invention to provide an inverter in which the transistors are driven to saturation only during the time that high load power is required.

Another object of the present invention is to provide an inverter that is more efficient than the prior art inverters.

It is yet another object of the present invention to provide an inverter that can handle relatively large amounts of power without over-heating.

These and other objects are achieved according to the principles of the present invention by providing means for instantaneously adjusting the input drive applied to the inverter transistors in accordance with the load demand.

The principles and operation of the present invention can be understood by referring to the following description and the accompanying drawings in which:

FIG. 1 is a circuit diagram, partly in block form, illustrating an embodiment of the invention, and FIG. 2 is a diagram illustrating various wave shapes encountered in the circuit of FIG. 1.

Referring now to FIG. 1, a complete inverter includes a conventional square wave exciter 11. This serves as a master inverter to supply switching signals to the power inverter 13.

Square wave sources suitable for this purpose are well-known in the art. Diagrams of such sources may be found for instance, on pages 110–129 of the Motorola Power Transistor Handbook, published by the Motorola Semiconductor Products Division of Motorola Inc., in 1961.

The output of the square wave source 11 is coupled to the power inverter 13 through an input transformer 15. The source 11 provides a square wave voltage of the desired frequency and of sufficient amplitude to saturate the transistors in the power inverter.

A pair of inverter transistors 17 and 19 are connected in a full-wave arrangement. Typically, NPN transistors are used for this purpose. They are connected through emitter resistors 21 and 23 to the negative terminal of a suitable D.C. supply 25. The emitter elements are also connected to a center-tap on the input transformer secondary winding through a biasing resistor 27 and a bypass capacitor 29.

The input transformer is connected to the base electrodes of the inverter transistors through the secondary windings 31 and 33 of a saturable core current transformer 35. The transistors act as switching elements to switch power from the D.C. source in accordance with signals applied to the signal input terminals of the switching elements.

The collector terminals of the transistors 17 and 19 are connected to the primary windings 39 and 41 of the transformer 35. These primary windings are connected to the center-tapped primary winding 43 of an output transformer 45. The secondary winding 47 of this transformer is connected to a load 49.

The core of the current transformer is formed from a rectangular hysteresis loop material. Such materials are characterized in that the flanks of their hysteresis loops are substantially vertical, and the saturation branches of the loop are substantially straight horizontal lines. Thus when the knee of such a loop is attained, magnetic saturation is attained at almost the same point.

Grain oriented 50% Ni-Fe alloys are presently preferred for this purpose. Such alloys are described in the Journal of Applied Physics, vol. 20, pp. 966–970 (October 1949). These grain oriented 50% Ni-Fe alloys are sold commercially under such tradenames as "Deltamax," "Orthonol," and "Orthonik."

The current transformer 35 typically has a high step-up ratio. In a representative inverter in which 20 amperes instantaneous current are supplied to the output transformer, each primary winding 39 and 41 consists of at single turn having a D.C. resistance of .01 ohms. The secondary windings 31 and 33 each contain ten turns and have a D.C. resistance of .025 ohms. These are wound on a commercially available wound toroidal core formed from 0.001" thick "Orthonol" tape. The windings are oriented so that any voltage induced in a secondary winding by current flowing from the output transformer to a given transistor tends to increase the conductivity of that transistor.

The operation of the invention can be understood by referring to the circuit diagram of FIG. 1 together with the graphs of FIG. 2. Assuming that the load consists of a switching type regulator such as a magnetic amplifier, the load voltage will consist of a square wave. Ordinarily, the load voltage will be of a larger amplitude than the exciter voltage and will be delayed with respect to the exciter voltage. This delay will occur because of the inductive nature of the circuit and will vary with the loading.

The load current consists of rectangular pulses of shorter duration than the pulses of load voltage since the magnetic amplifier load characteristically requires power only during the latter portion of each half cycle of its operation.

During the time that the load is not drawing current, the only current demanded from the inverter transistors is the exciting current required by the output transformer 43 and the current transformer 35. This "no load" current flowing through the primary of the current transformer is not sufficient to drive the core into saturation. Since the core is not saturated, the impedance of the secondary windings 31 and 33 is relatively high. The high impedance of these windings, in turn, limits the transistor base current to a small value during this time.

When the load begins to draw current however, the core of the transformer 35 is driven into saturation since this load current is reflected into the primary. This causes a corresponding high current to flow through the primary windings 39 and 41. When the transformer is thus driven to saturation, the impedance of the secondary windings 31 and 33 becomes negligible. This permits relatively large currents to flow to the base of the transistors 17 and 19 at precisely the time when such large currents are demanded. In this way the drive current supplied to the transistors is automatically and instantaneously adjusted to the demands made upon the inverter transistors. The average drive current supplied to these transistors is relatively low. The transistors are able to operate in the most efficient manner because the high drive currents are limited to only those times when maximum currents are required.

In cases in which extremely heavy currents are demanded, parallel transistors may be used in each half of the circuit.

Although the description of the invention has been limited to circuits utilizing transistors, the principles of the invention can be applied to circuits employing equivalent types of electron discharge devices.

Only a single load has been indicated in FIG. 1. Many applications arise, however, in which a single inverter is used to energize several loads and in which each load is coupled through a separate output winding on the output transformer. Inverters utilizing the principles of the invention are particularly well suited for this kind of service since the inverter transistor drive is automatically adjusted in response to the total instantaneous power demanded by each of the loads.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An inverter comprising means to produce a train of square wave exciting signals; a source of direct current; an output transformer; means to switch energy from the direct current source to alternate ends of the primary winding of said output transformer; first coupling means to couple the square wave exciting signals to the input terminals of said switching means; second coupling means to couple energy from said output transformer to a load; and a saturable core current transformer having its primary winding connected in series with the primary winding of the output transformer, said current transformer further having its secondary winding connected in series with the input terminals of said switching means, said current transformer having sufficient primary turns to saturate only when a reflected load current of a predetermined magnitude flows through its primary winding.

2. An inverter comprising a source of square waves; an electron discharge device; an output transformer for coupling the inverter to a load; a current transformer, said current transformer having a core made from a rectangular hysteresis loop material; a primary winding on said current transformer connected between the output of the electron discharge device and the output transformer; a secondary winding on the current transformer connected between the square wave source and the input of the electron discharge device; said primary winding having a number of turns such that the level of magnetizing force necessary to saturate the transformer core is intermediate the level of magnetizing force produced when only a no-load current is flowing in the winding and the level of magnetizing force produced when a reflected load current of a predetermined magnitude is flowing in the winding.

3. The inverter of claim 2 in which the current transformer core is made from grain oriented 50% Ni-Fe alloy.

4. An inverter for supplying square wave alternating currents to a load comprising a source of square wave exciting voltages; an electron discharge device; an output transformer for coupling power to the load, a saturable core current transformer; a primary winding on said current transformer conneced between the output of the electron discharge device and the output transformer; a secondary winding on said current transformer connected between the square wave source and the input of the electron discharge device; and a magnetic core in said current transformer formed from a rectangular hysteresis loop material; said current transformer being maintained in the unsaturated state by the no-load current of the power transformer, said current transformer having a sufficient number of turns in its primary winding to be driven into saturation by a reflected load current of a predetermined magnitude flowing in the power transformer primary winding.

5. An inverter for supplying square wave alternating currents to a load comprising a source of square waves; an electron discharge device; an output transformer; a saturable core current transformer; a magnetic core in said current transformer having a rectangular hysteresis loop; a primary winding in said current transformer connected between the output of the electron discharge device and the power transformer; and a secondary winding on said current transformer connected between the source of square waves and the input of the electron discharge device, said current transformer having a sufficient number of primary turns so that its magnetic core is driven through the knee of the saturation curve whenever load current drain exceeds a predetermined threshold, said secondary winding having sufficient impedance when the core of the current transformer is saturated to limit the current through the electron discharge device to a value less than its saturation value.

6. Means to supply a specified alternating current to a load comprising a source of square waves; an electron discharge device; an output transformer for supplying current to the load; a saturable core current transformer; a primary winding on said current transformer connected between the output of the electron discharge device and the output transformer; and a secondary winding on said current transformer connected between the square wave source and the input of the electron discharge device, said current transformer having a sufficient number of turns on the primary winding to magnetically saturate the core only when the specified instantaneous peak load current is drawn.

7. An inverter for supplying alternating current of at least a specified magnitude to a load comprising an output transformer having a center-tapped primary winding; a saturable core current transformer; first and second pimary windings on said current transformer connected in series with the first and second ends respectively of the output transformer primary winding; first and second transistors connected to pass load currents to the output transformer through said first and second current transformer primary windings respectively; first and second secondary windings on said current transformer connected in series with the input terminals of said first and second transistors respectively; and a source of square waves for driving said transistors in an out-of-phase relationship, said current transformer having a sufficient number of turns on either primary winding to magnetically saturate the core only when the specified instantaneous peak load current is drawn.

8. An inverter to supply a specified alternating current to a load comprising a source of square waves; an output transformer for coupling power to a load; a source of direct current; a source of square wave alternating current; an electron discharge device for coupling power from the direct current source to the output transformer in response to signals from the square wave source; a saturable core current transformer; a primary winding on said current transformer connected between the output of the electron discharge device and the output transformer; and a secondary winding on said current transformer connected betwen the square wave source and the input of the electron discharge device, said current transformer having a sufficient number of turns on the primary winding to magnetically saturate the core when the specified instantaneous peak load current is drawn.

References Cited

UNITED STATES PATENTS

| | | | |
|---|---|---|---|
| 2,596,606 | 5/1952 | Scherer | 321—32 |
| 2,626,378 | 1/1953 | Levy | 321—11 |
| 2,809,303 | 10/1957 | Collins | 307—88 |
| 3,161,837 | 12/1964 | Lloyd | 321—2 X |
| 3,300,706 | 1/1967 | Wellford | 321—43 |

W. M. SHOOP, *Assistant Examiner.*

JOHN F. COUCH, *Primary Examiner.*